US007615899B2

(12) United States Patent
Hashiba (10) Patent No.: US 7,615,899 B2
(45) Date of Patent: Nov. 10, 2009

(54) MAGNETO GENERATOR WITH ARRANGEMENTS FOR LEAD WIRES OF THREE-PHASE WINDINGS

(75) Inventor: Mitsuharu Hashiba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 359 days.

(21) Appl. No.: 11/519,077

(22) Filed: Sep. 12, 2006

(65) Prior Publication Data
US 2007/0132325 A1   Jun. 14, 2007

(30) Foreign Application Priority Data
Dec. 13, 2005  (JP)  ............................. 2005-358548
Feb. 17, 2006  (JP)  ............................. 2006-040514

(51) Int. Cl.
*H02K 3/00* (2006.01)
(52) U.S. Cl. ..................................................... 310/71
(58) Field of Classification Search ................... 310/71, 310/74, 179, 180
See application file for complete search history.

(56) References Cited

U.S. PATENT DOCUMENTS 6,472,790 B2 * 10/2002 Rose, Sr. .................... 310/184
7,329,973 B2 * 2/2008 Oohashi et al. ............... 310/71
2004/0150276 A1 * 8/2004 Yokoyama et al. ............ 310/71
2004/0183388 A1 * 9/2004 Rittmeyer .................... 310/179
2007/0007832 A1 * 1/2007 Ichikawa et al. .............. 310/71

FOREIGN PATENT DOCUMENTS

| JP | 8-126276 A | 5/1996 |
|---|---|---|
| JP | 9-325250 A | 12/1997 |
| JP | 11-178265 A | 7/1999 |
| JP | 2000-92802 A | 3/2000 |
| JP | 2003-158845 A | 5/2003 |

* cited by examiner

*Primary Examiner*—Tran N Nguyen
(74) *Attorney, Agent, or Firm*—Sughrue Mion, PLLC (57) ABSTRACT

In a magneto generator, second phase lead wires (10a, 10b) and third phase lead wires (11a, 11b) among individual one pair of first, second and third lead wires (9a, 9b; 10a, 10b; 11a, 11b) are covered with first protective tubes (12a, 12b), respectively. The second phase lead wires (10a, 10b) and the third phase lead wires (11a, 11b) covered with the first protective tubes (12a, 12b) are bent toward the first phase lead wires (9a, 9b) in a circumferential direction and bundled together with the first phase lead wires (9a, 9b). The first phase lead wires (9a, 9b), the second phase lead wires (10a, 10b) and the third phase lead wires (11a, 11b) thus bundled are bent in a direction opposite to the circumferential direction and covered with second protective tubes (22a, 22b, 22c), respectively.

7 Claims, 9 Drawing Sheets

MAGNETO GENERATOR WITH ARRANGEMENTS FOR LEAD WIRES OF THREE-PHASE WINDINGS

BACKGROUND OF THE INVENTION

1. Field of the Invention

The present invention relates to a magneto generator which generates electricity under the electromagnetic induction action of a permanent magnet and a magneto coil in accordance with the rotation of a flywheel.

2. Description of the Related Art

In the past, as a magneto generator, there has been known one in which individual phase lead wires of a magneto coil, which are drawn out in an axial direction at circumferential intervals and covered with a protective tube, are pressed against the end face sides of coil ends of the individual phase lead wires by the use of bands, respectively (see, for example, a first patent document: Japanese patent application laid-open No. 2005-110364 (FIG. 2)).

Also, as a magneto generator, there has also been known another one which includes a flywheel that rotates about an axis of rotation, a stator core that is arranged at an inner side of the flywheel and has a plurality of teeth protruding to a diametrally outer side, a magneto coil that has a conductor wound around the teeth, respectively, and lead wires drawn outwardly from the stator core, a lead that has one end portion thereof electrically connected with a lead wire and the other end thereof electrically connected with electrical equipment, and a lead clamp that has a basal end portion fixedly secured to the stator core by a tightening element together with the lead (see, for example, a second patent document: Japanese patent application laid-open No. H8-126276 (FIG. 7)).

The lead clamp serves to position the lead with respect to the stator core by clamping the opposite sides of the lead in the rotation axis direction, whereby the vibration resistance strength of the lead can be ensured.

In the flywheel of the conventional magneto generator of the first patent document, a plurality of bands are used so as to make the vibration resistance of each lead wire, so there is a problem of requiring a lot of number of parts.

In addition, in the conventional magneto generator of the second patent document, there is a problem that the lead clamp serves to clamp the opposite sides of the lead, so the axial dimension of the stator, which is constituted by the stator core and the magneto coil, is large.

Moreover, it is also considered that a gap is generated between the lead clamp and the magneto coil, and degraded matter such as oil mist, etc., is deposited in this gap, so the lead might be broken or disconnected due to such a deposit.

SUMMARY OF THE INVENTION

Accordingly, the present invention is intended to obviate the problems as referred to above, and has for its object to obtain a magneto generator which is capable of reducing the number of parts required.

Another object of the present invention is to obtain a magneto generator in which the axial dimension of a stator is reduced to prevent the deposition of degraded matter such as oil mist, etc., in a gap.

A magneto generator according to one aspect of the present invention includes: a flywheel that rotates about an axis of rotation; a plurality of permanent magnets that are arranged on an inner peripheral wall surface of the flywheel in a circumferential direction thereof and fixedly secured thereto; a stator core that is arranged at a diametrally inner side of the flywheel with its outer peripheral surface being in opposition to the permanent magnets; and a three-phase magneto coil that has an conductor wound around each of teeth that are formed on an outer peripheral portion of the stator core so as to radially protrude in diametrally outer directions at equal intervals. The second phase lead wires and the third phase lead wires among individual one pair of the first, second and third phase lead wires of the magneto coil which are led out in an axial direction at circumferential intervals are bent in a circumferential direction toward the first phase lead wires, and bundled together with the first phase lead wires. The first phase lead wires, the second phase lead wires and the third phase lead wires thus bundled are respectively bent in a direction opposite to the circumferential direction.

In addition, a magneto generator according to another aspect of the present invention includes: a flywheel that rotates about an axis of rotation; a plurality of permanent magnets that are arranged on an inner peripheral wall surface of the flywheel in a circumferential direction thereof and fixedly secured thereto; a stator core that is arranged at a diametrally inner side of the flywheel with its outer peripheral surface being in opposition to the permanent magnets; and a magneto coil that has an conductor wound around each of teeth that are formed on an outer peripheral portion of the stator core so as to radially protrude in diametrally outer directions at equal intervals, the magneto coil also having a lead wire that is led outwardly from the stator core; a lead that has one end portion thereof electrically connected to the lead wire and the other end thereof electrically connected to electrical equipment; and a lead clamp that has a basal end fixedly attached to the stator core by a tightening element, and an opening portion that opens to the magneto coil. The lead clamp covers the lead and at the same time presses the lead toward the magneto coil through the opening portion.

According to a magneto generator of the present invention, there is obtained an advantageous effect that the number of parts required can be reduced.

In addition, according to a magneto generator of the present invention, the axial dimension of a stator is reduced so that degraded matter such as oil mist, etc., is not likely to deposit in a gap.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout respective figures, the same or corresponding members or parts are identified by the same reference numerals and characters.

Embodiment 1

Figure 1:
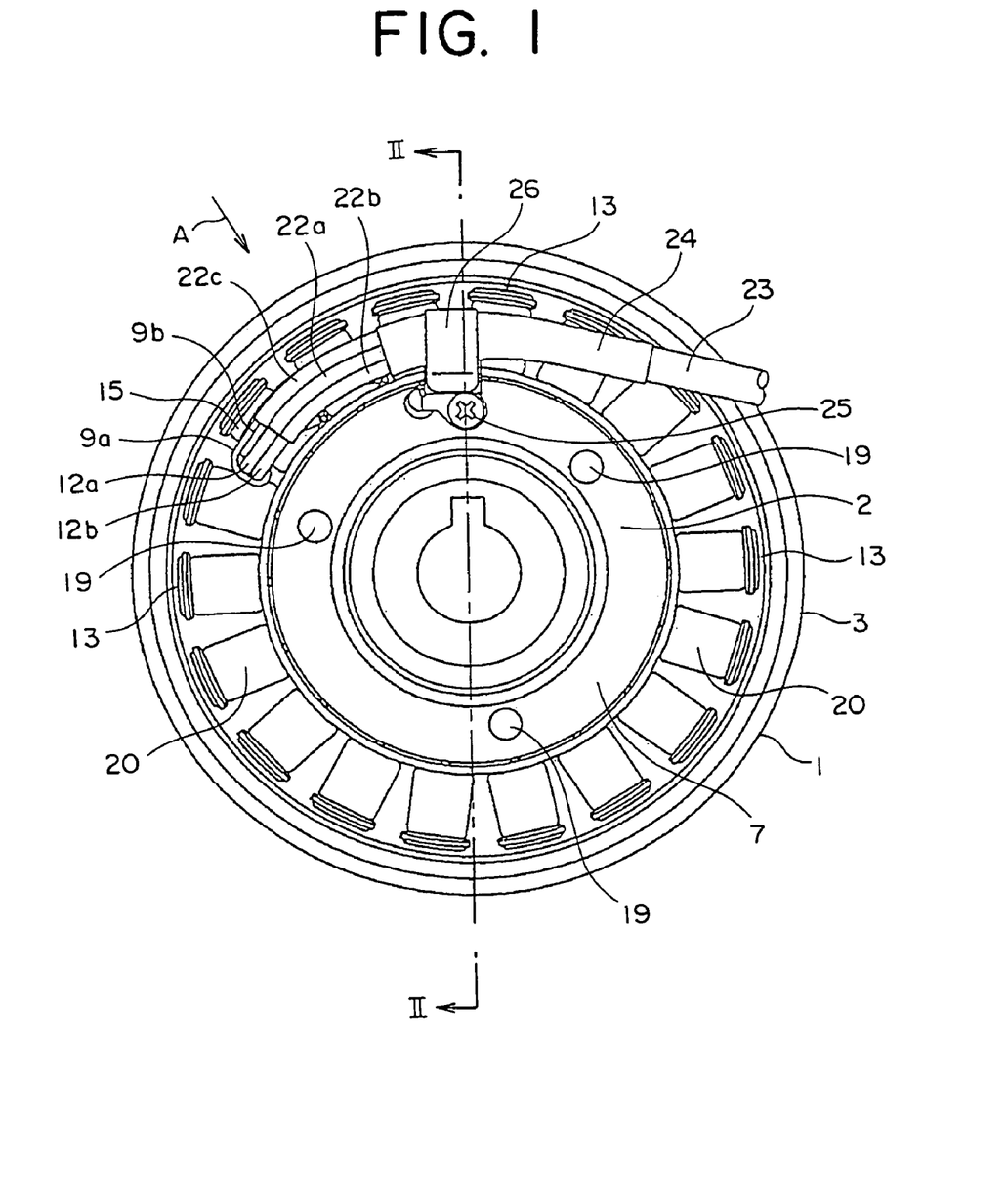
FIG. 1 is a front elevational view showing a magneto generator according to a first embodiment of the present invention.
Figure 2:
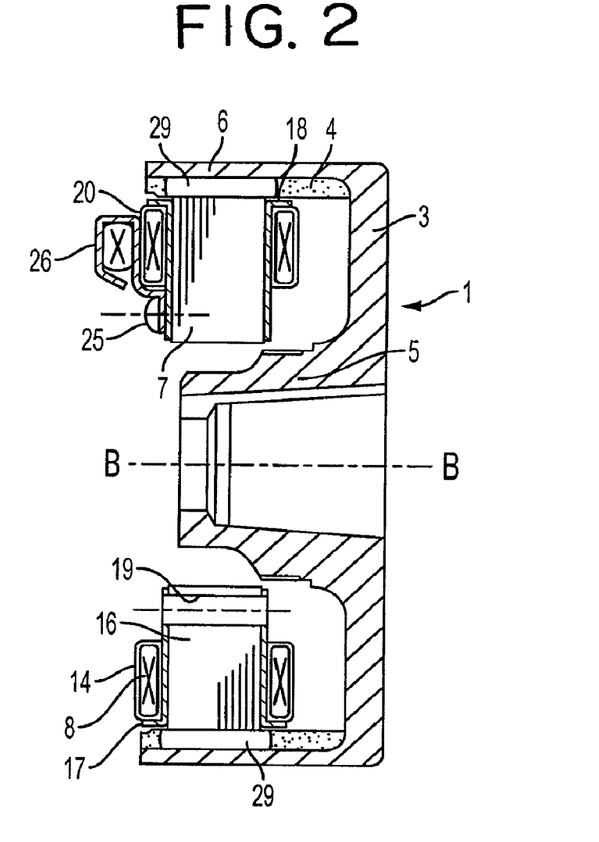
FIG. 2 is a cross sectional arrow view along line II-II of FIG. 1.
Figure 3:
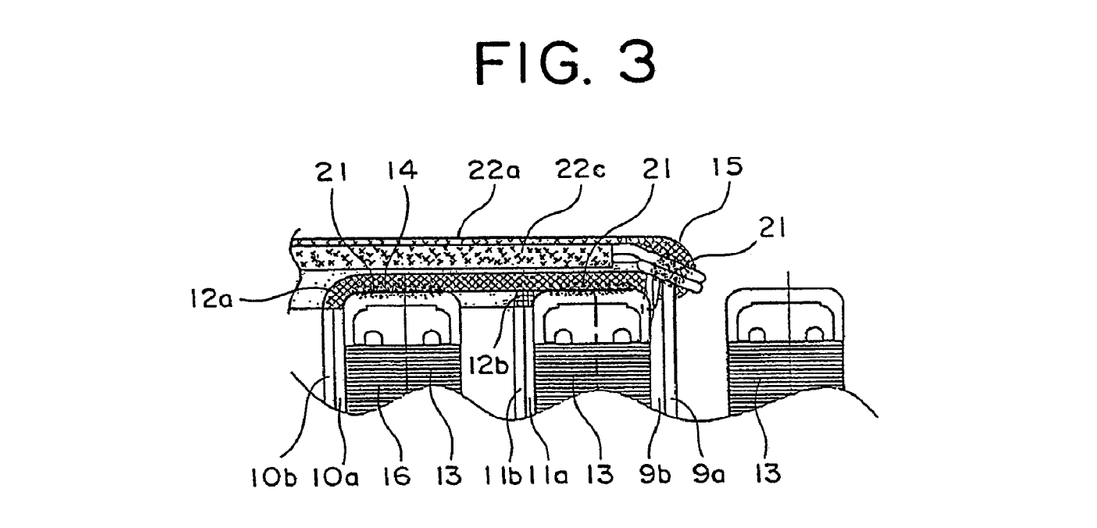
FIG. 3 is a partial side elevational view when a stator of FIG. 1 is seen from the direction of arrow A.

Referring to the drawings and first to FIG. 1, therein is shown a magneto generator according to a first embodiment of the present invention. FIG. 2 is a cross sectional side elevational view of the magneto generator of FIG. 1, and FIG. 3 is a partial side elevational view when a stator 2 is seen from the direction of arrow A in FIG. 1.

This magneto generator is provided with a rotor 1 connected with an internal combustion engine.

The rotor 1 is provided with a bowl-shaped flywheel 3 and permanent magnets 29 (shown in FIG. 2). The flywheel 3 rotates about an axis of rotation B-B. A boss portion 5 is fixedly secured to a rotation shaft (not shown) which is driven to rotate by the internal combustion engine.

A plurality of (i.e., four) permanent magnets are fixedly secured to the inner peripheral surface of a cylindrical portion 6 of the flywheel 3. As for the permanent magnet, two magnets each polarized in order of N pole, S pole and N pole, and two magnets each polarized in order of S pole, N pole and S pole, are alternately arranged at mutually equal angular intervals around the axis of rotation B-B. The plurality of permanent magnets are polarized in such a manner that adjoining permanent magnets have mutually opposite polarities, whereby in an inner side space of the permanent magnet, there is generated a magnetic field, the direction of which changes alternately.

A cylindrical guard ring (not shown) is fitted into the inner peripheral surface of each permanent magnet in intimate contact therewith. A resin material 4 is filled into between the opposite end sides in the direction of the axis of rotation B-B of each permanent magnet 29, and between individual adjoining permanent magnets 29. The plurality of permanent magnets 29 and the guard ring are fixedly secured to the inner peripheral surface of the cylindrical portion 6 of the flywheel 3 by means of the resin material 4.

The stator 2 has a hollow cylindrical stator core 7 and three-phase magneto coils 8. On the outer peripheral portion of the stator core 7, there are formed a plurality of teeth 13 that radially protrude in a diametrally outside direction at equal intervals.

The stator core 7 having the plurality of teeth 13 formed on its outer peripheral portion is composed of a laminated iron core 16 which is formed of a multitude of thin hollow magnetic steel plates in the form of cold rolled steel plates laminated one over another in the direction of the axis of rotation B-B, and a first end plate 17 and a second end plate 18 superposed on the opposite side surfaces of the laminated core 16, respectively, in intimate contact therewith.

The first end plate 17 and the second end plate 18 of a hollow configuration made of cold rolled steel sheet, etc., have their outer and inner peripheral portions respectively bent toward the magneto coil 8 so as to hold the magneto coil 8.

Three through holes 19 are formed through the laminated iron core 16 and the first and second end plates 17, 18 in parallel to the axis of rotation B-B. The laminated iron core 16 and the first and second end plates 17, 18 are integrated with one another by means of bolts (not shown) inserted through the through holes 19 and nuts (not shown) threaded on the bolts, respectively.

The magneto coil 8 is formed by winding conductors having their surfaces coated with enamel on the circumferential side surfaces of the teeth 13 of the stator core 7. The magneto coil 8 is in the form of a three-phase magneto coil having individual coil portions connected with one another through a delta connection. The circumferential side surface of the magneto coil 8 is covered with a resin molding material 20.

A pair of first phase lead wires 9a, 9b, a pair of second phase lead wires 10a, 10b, and a pair of third phase lead wires 11a, 11b are led out in an axial direction at circumferential intervals.

The pair of second phase lead wires 10a, 10b and the pair of third phase lead wires 11a, 11b have their tip ends covered with the first protective tubes 12a, 12b, respectively. The second phase lead wires 10a, 10b and the third phase lead wires 11a, 11b, after being bent to the first phase lead wires 9a, 9b (in a counterclockwise direction in FIG. 1), are bundled together with the first phase lead wires 9a, 9b, and the first phase lead wires 9a, 9b, the second phase lead wires 10a, 10b and the third phase lead wires 11a, 11b thus bundled are again bent to the second phase lead wires 10a, 10b (in a clockwise direction in FIG. 1).

The first phase lead wires 9a, 9b, the second phase lead wires 10a, 10b and the third phase lead wires 11a, 11b thus bent are covered with second protective tubes 22a, 22b, 22c, respectively.

Here, note that the first protective tubes 12a, 12b and the second protective tubes 22a, 22b, 22c are excellent in thermal resistance and insulation performance, and are formed by impregnating varnish into tubes woven with polyester fiber.

The first protective tubes 12a, 12b covering the second phase lead wires 10a, 10b and the third phase lead wires 11a, 11b are fixedly attached or bonded to an end face of a coil end 14 of the magneto coil 8 by a bonding member 21 comprising epoxy resin or varnish. Also, the first protective tubes 12a, 12b and the first phase lead wires 9a, 9b are attached or bonded to each other by means of the bonding member 21.

In addition, the first protective tubes 12a, 12b covering the second phase lead wires 10a, 10b and the third phase lead wires 11a, 11b are wound with and bundled by one first phase lead wire 9a of the pair of first phase lead wires 9a, 9b, together with the other first phase lead wire 9b.

The first phase lead wires 9a, 9b, the second phase lead wires 10a, 10b and the third phase lead wires 11a, 11b are electrically connected to three lead portions, respectively, of 5 strand structure that together form a lead 23, inside the second protective tubes 22a, 22b, 22c. Accordingly, after the first phase lead wires 9a, 9b, the second phase lead wires 10a, 10b and the third phase lead wires 11a, 11b are electrically connected to the three lead portions, respectively, the second protective tubes 22a, 22b, 22c are inserted, respectively.

By means of these second protective tubes 22a, 22b, 22c, the individual phase lead wires 9a, 9b, 10a, 10b, 11a, 11b are electrically insulated from one another, and at the same time, individual connecting portions between these lead wires 9a, 9b, 10a, 10b, 11a, 11b and the three lead portions are also electrically insulated.

An end of the lead 23 for leading out to electrical equipment (not shown) is covered with a third protective tube 24. The lead 23 is fixedly held by a lead clamp 26 through a third protective tube 24. The lead clamp 26 is fixedly fastened to the stator core 7 by a screen 25.

In the magneto generator as constructed above, the flywheel 3 is caused to rotate in conjunction with the rotation of the rotation shaft (not shown) which is driven to rotate by the internal combustion engine, whereby electric power is generated in the magneto coil 8 by means of an alternating field generated by the permanent magnets. An AC output thus generated is rectified by an unillustrated rectifier diode, and fed to a load such as a battery mounted on a vehicle.

According to the magneto generator of the above-mentioned construction, the second phase lead wires 10a, 10b and the third phase lead wires 11a, 11b covered with the first protective tubes 12a, 12b are bent toward the first phase lead wires 9a, 9b in a counterclockwise direction in FIG. 1. The second phase lead wires 10a, 10b and the third phase lead wires 11a, 11b thus bent are bundled together with the first phase lead wires 9a, 9b, and the first phase lead wires 9a, 9b, the second phase lead wires 10a, 10b and the third phase lead wires 11a, 11b thus bundled are bent in a clockwise direction in FIG. 1 and covered with the second protective tubes 22a, 22b, 22c, respectively.

As a result, with the lead 23 being fixedly held by the lead clamp 26, the second protective tubes 22a, 22b, 22c arranged in a line along a diametral direction act to press the first protective tubes 12a, 12b against the end face of the coil end 14, and the second protective tubes 22a, 22b, 22c are placed in intimate contact with the first protective tubes 12a, 12b, whereby an increase in the axial dimension of the stator 2 can be prevented.

In addition, vibrations of the individual lead wires 9a, 9b, 10a, 10b, 11a, 11b are prevented, thus making unnecessary those parts which are conventionally required and exclusively used for vibration resistance.

Moreover, since the first protective tubes 12a, 12b are fixedly attached or fastened to the end face of the coil end 14 by means of the bonding member 21, the vibrations of the second phase lead wires 10a, 10b and the third phase lead wires 11a, 11b are prevented in a reliable manner without requiring additional parts.

Further, the bonding member 21 has thermal resistance, and hence contributes to improvements in thermal resistance of the second phase lead wires 10a, 10b and the third phase lead wires 11a, 11b.

Furthermore, the first phase lead wires 9a, 9b, the second phase lead wires 10a, 10b and the third phase lead wires 11a, 11b protrude from between the individual teeth 13, respectively, so the winding space of the conductor wound around each tooth 13 can be ensured.

In addition, the first phase lead wires 9a, 9b are arranged at locations more apart from the lead 23 than the second phase lead wires 10a, 10b, and the third phase lead wires 11a, 11b, and the lead 23 is positioned in a direction of extension of the lead-out individual phase lead wires 9a, 9b, 10a, 10b, 11a, 11b covered with the second protective tubes 22a, 22b, 22c, 23. With such an arrangement, the ends of the individual phase lead wires 9a, 9b, 10a, 10b, 11a, 11b and the end of lead 23 can be electrically connected to one another in a smooth manner, and useless elongation of these lead wires 9a, 9b, 10a, 10b, 11a, 11b and the lead 23 can be prevented.

Moreover, the one first phase lead wire 9a is wound around the first protective tubes 12a, 12b together with the other first phase lead wire 9b to bundle them together, so the first protective tubes 12a, 12b are tightly secured by a bent portion 15, thus making it possible to improve vibration resistance of the first protective tubes 12a, 12b in the bent portion 15.

Embodiment 2

Figure 4:
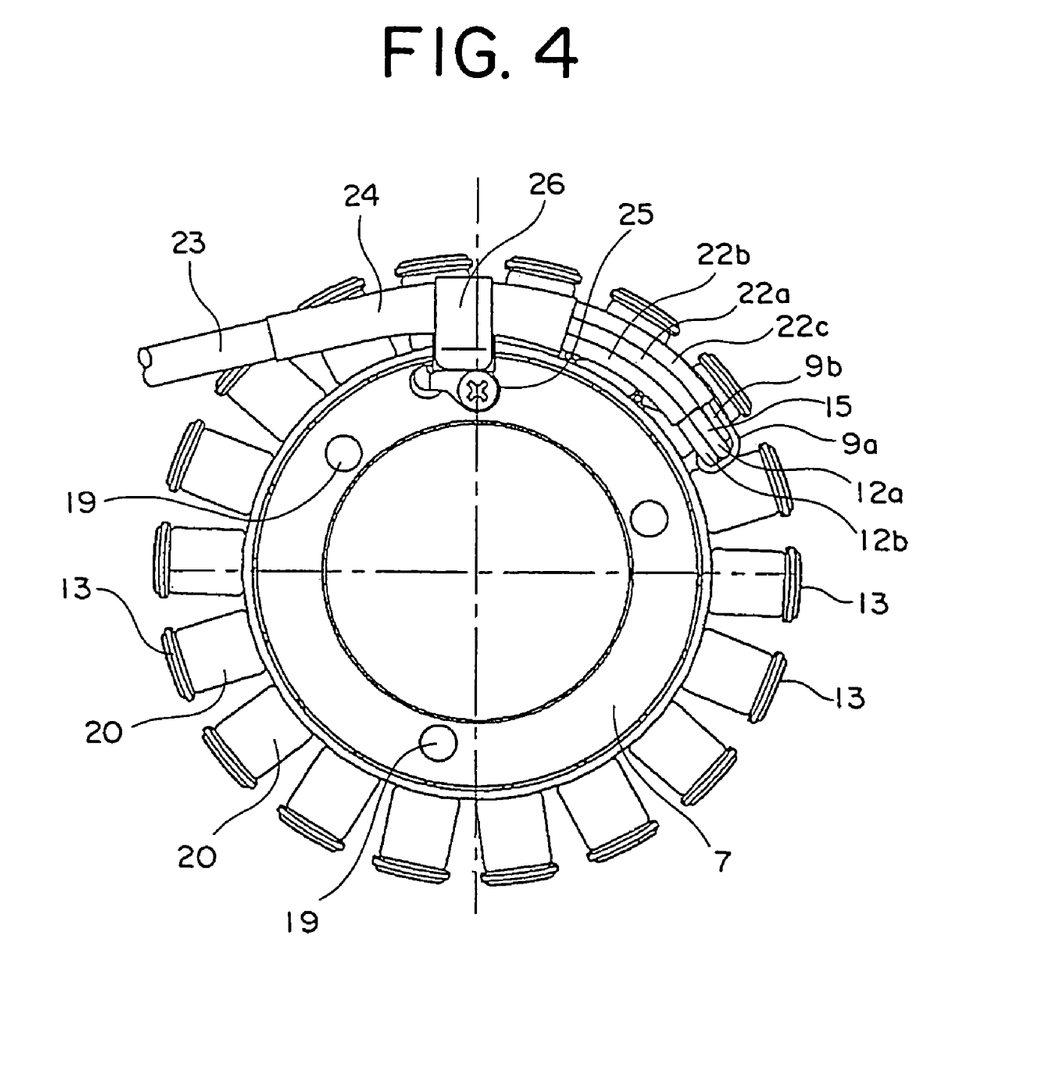
FIG. 4 is a front elevational view showing a magneto generator according to a second embodiment of the present invention.

FIG. 4 is a front elevational view that shows a magneto generator according to a second embodiment of the present invention. In the first embodiment, the lead-out direction of the lead 23 for connection to electrical equipment is located at the right of the magneto generator, as shown in FIG. 1, but in contrast, in this second embodiment, the lead-out direction of the lead 23 for connection to electrical equipment is located at the left of the magneto generator, as shown in FIG. 4.

Thus, in the first embodiment, the bent portion 15 for the first protective tubes 12a, 12b are formed at the left of the lead clamp 26 in FIG. 1, but in contrast, in this second embodiment, the bent portion 15 is formed at the right of the lead clamp 26 in FIG. 4.

The construction of this second embodiment other than the above is similar to that of the first embodiment.

In this embodiment, too, the first phase lead wires 9a, 9b are arranged at locations more apart from the lead 23 than the second phase lead wires 10a, 10b, and the third phase lead wires 11a, 11b, and the lead 23 is positioned in a direction of extension of the individual lead-out phase lead wires 9a, 9b, 10a, 10b, 11a, 11b covered with the second protective tubes 22a, 22b, 22c, 23. With such an arrangement, the ends of the individual phase lead wires 9a, 9b, 10a, 10b, 11a, 11b and the ends of the individual lead portions of the lead 23 can be electrically connected to one another in a smooth manner, and useless elongation of these lead wires 9a, 9b, 10a, 10b, 11a, 11b and the lead 23 can be prevented.

Embodiment 3

Figure 5:
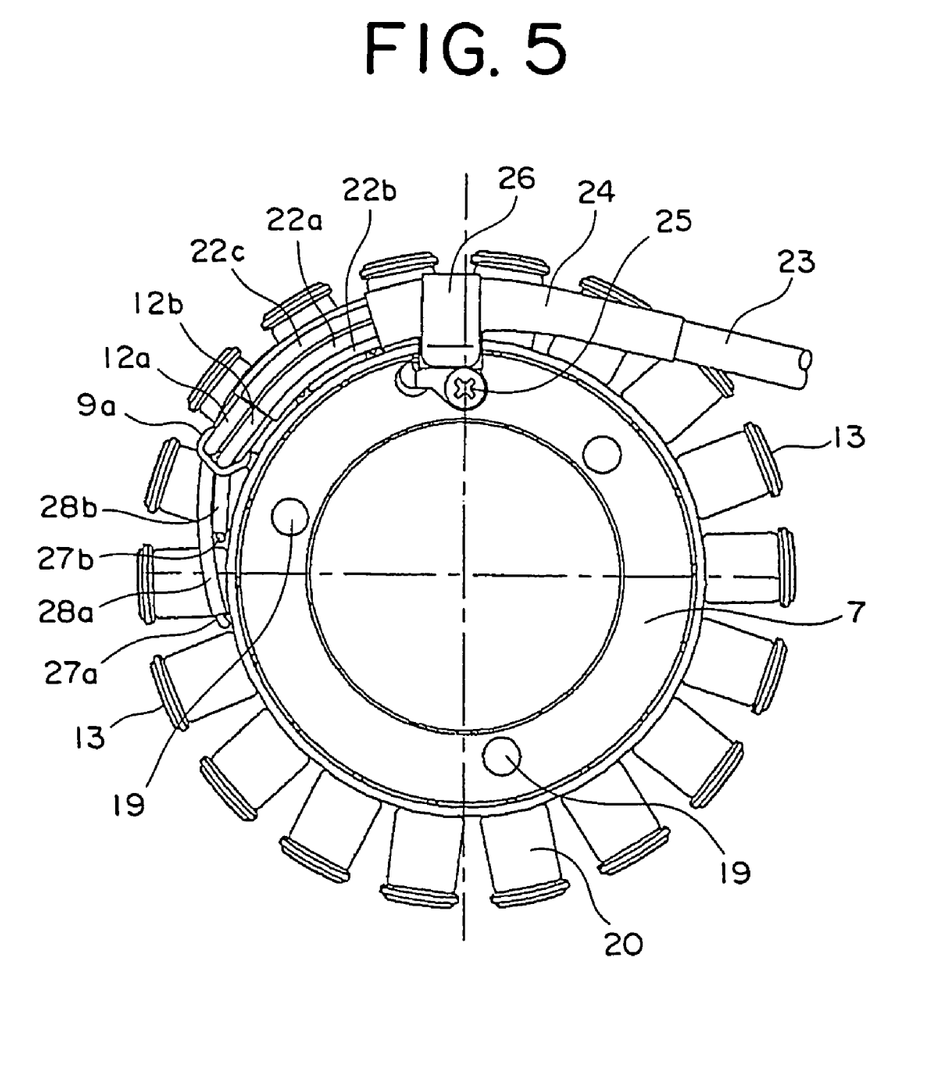
FIG. 5 is a front elevational view showing a stator of a magneto generator according to a third embodiment of the present invention.

FIG. 5 is a front elevational view that shows a stator of a magneto generator according to a third embodiment of the present invention.

In this embodiment, a conductor is wound around the circumferential side surfaces of teeth 13 of a stator core 7 to form an ignition signal coil. Signal lead wires 27a, 27b of this ignition signal coil are led out in an axial direction, and covered with fourth protective tubes 28a, 28b.

Similar to the first protective tubes 12a, 12b and the second protective tubes 22a, 22b, 22c, the fourth protective tubes 28a, 28b are formed by impregnating varnish into tubes woven with polyester fiber.

The signal lead wires 27a, 27b protruded in the axial direction are first bent in a clockwise direction in FIG. 5, and are then bundled by one first phase lead wire 9*a* wound therearound together with the other first phase lead wire 9*b*, the second phase lead wires 10*a*, 10*b* and the third phase lead wires 11*a*, 11*b* covered with the first protective tubes 12*a*, 12*b*.

The construction of this third embodiment other than the above is similar to that of the first embodiment.

In this embodiment, the signal lead wires 27*a*, 27*b* are tightly secured by the one first phase lead wire 9*a* together with the other first phase lead wire 9*b*, the second phase lead wires 10*a*, 10*b* and the third phase lead wires 11*a*, 11*b*. As a result, there can be obtained, in addition to the advantageous effects of the first embodiment, a further advantageous effect that the vibration resistance of the signal lead wires 27*a*, 27*b* can be improved.

Embodiment 4

Figure 6:
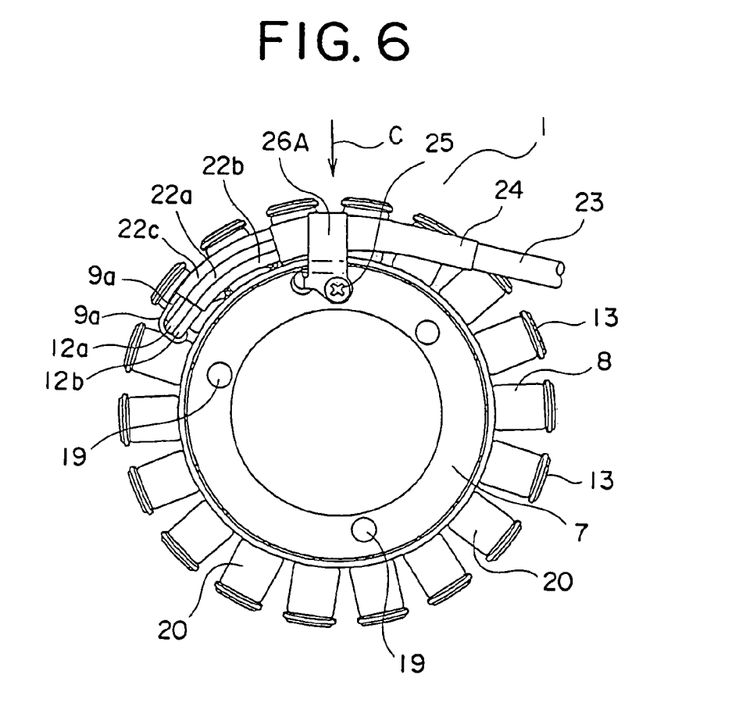
FIG. 6 is a front elevational view showing a stator of a magneto generator according to a fourth embodiment of the present invention.
Figure 7:
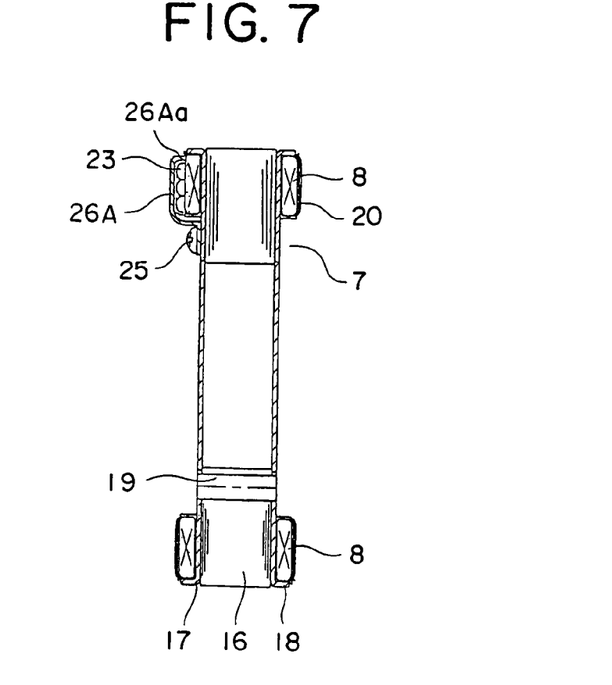
FIG. 7 is a cross sectional side elevational view of a magneto generator of FIG. 6.
Figure 8:
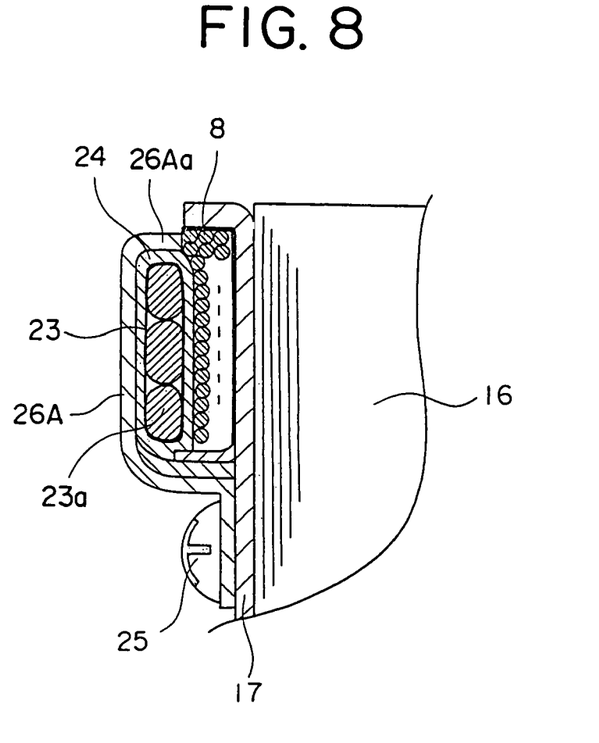
FIG. 8 is an enlarged view of essential portions of the magneto generator of FIG. 7.
Figure 9:
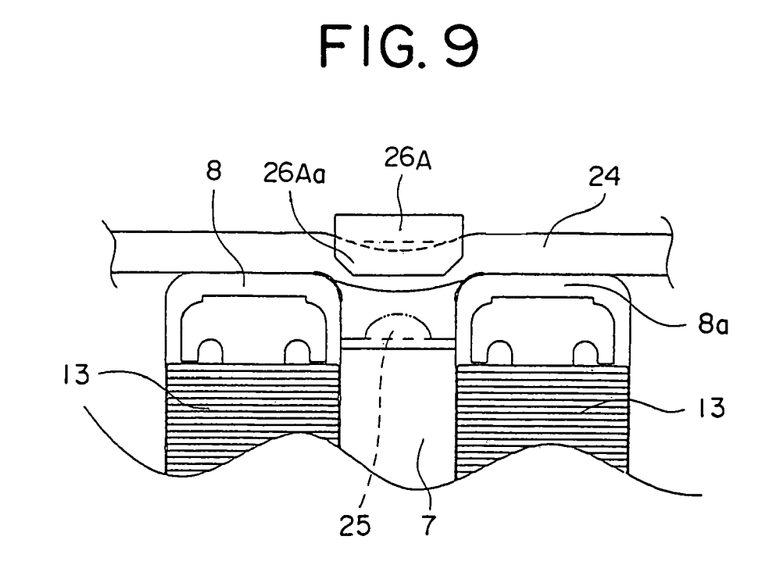
FIG. 9 is a view when the stator of FIG. 6 is seen from the direction of arrow C.

FIG. 6 is a front elevational view that shows a stator of a magneto generator according to a fourth embodiment of the present invention. FIG. 7 is a cross sectional side elevational view of the magneto generator of FIG. 6, and FIG. 8 is an enlarged view of essential portions of the magneto generator of FIG. 7. FIG. 9 is a view when the stator of FIG. 6 is seen from the direction of arrow C.

In this embodiment, a lead clamp 26A has a base end portion thereof fixedly fastened to a stator core 7 by means of a tightening element in the form of a screen 25. The lead clamp 26A made of resin has a bent portion 26Aa whose diametral outermost portion is bent toward a magneto coil 8, and also has an opening portion formed at a side near the magneto coil 8. The lead clamp 26A covers the lead 23 and at the same time presses the lead 23 toward a coil end 8*a* of the magneto coil 8 through the opening portion. In addition, the lead clamp 26A is arranged between adjoining teeth 13 when seen along the direction of the axis of rotation.

According to the magneto generator of this fourth embodiment, the lead clamp 26A covers the lead 23 covered with the third protective tube 24 and at the same time presses the lead 23 toward the coil end 8*a* of the magneto coil 8 through the opening portion, whereby the lead 23 is placed into intimate contact with the magneto coil 8 through the third protective tube 24, thereby making it possible to reduce the axial dimension of the stator 2.

In addition, there is no gap formed between the lead 23 and the coil end 8*a* of the magneto coil 8, so it is possible to prevent the deposition of degraded matter such as oil mist, etc., in the gap, and hence the resultant break or disconnection of the lead 23.

Also, the lead clamp 26A is arranged between the adjoining teeth 13 when viewed along the direction of the axis of rotation, so the lead 23 being pressed by the lead clamp 26A is inserted into between the teeth 13 by bending deformation, and the adjoining teeth 13, the lead clamp 26A and the lead 23 are much more integrated with one another. Accordingly, the axial dimension of the stator 2 is further reduced, and the displacement in the circumferential direction of the lead 23 due to its vibration can be prevented, whereby the break or disconnection of the lead 23 and the lead wires 10*a*, 10*b*, 11*a*, 11*b*, 12*a*, 12*b* resulting from the difference in the vibration frequencies of the teeth 13, the lead clamp 26A and the lead 23 can be reduced.

Further, since the lead 23 has the bent portion 26Aa whose diametral outermost portion is bent toward the magneto coil 8, the diametral position adjustment of the lead 23 can be easily carried out by adjusting the length in the direction of the bending of the bent portion 26Aa.

Embodiment 5

Figure 10:
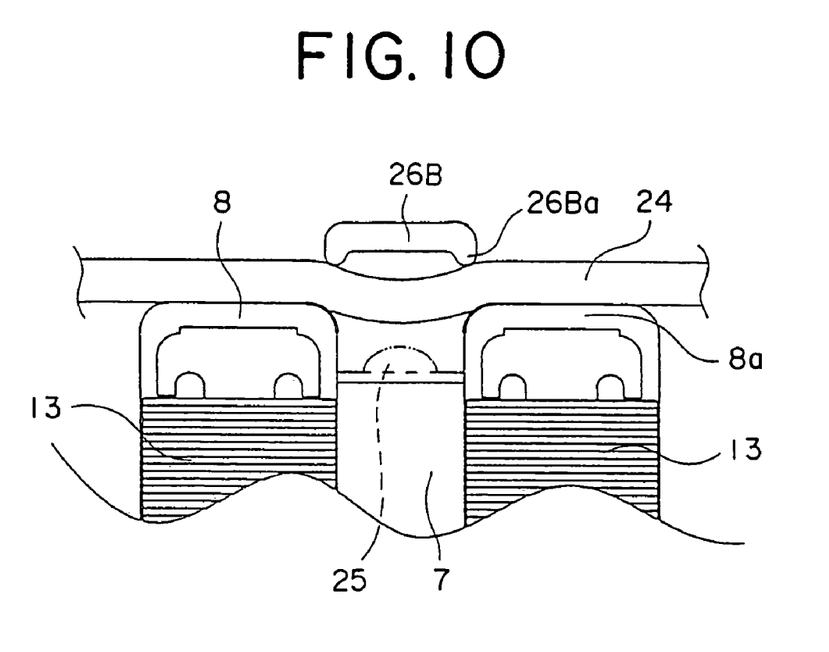
FIG. 10 is a side elevational view showing a magneto generator according to a fifth embodiment of the present invention.

FIG. 10 is a side elevational view of essential portions of a magneto generator according to a fifth embodiment of the present invention.

In this magneto generator, a lead clamp 26B made of resin has protrusions 26Ba formed at opposite side edges of a surface pressing against a coil end 8*a*.

The construction of this fifth embodiment other than the above is similar to that of the fourth embodiment.

In this embodiment, the protrusions 26Ba are formed on the opposite side edges of the lead clamp 26 B, and the lead 23 is pressed toward the coil end 8*a* by means of the protrusions 26Ba at two locations, so in particular, the displacement in the circumferential direction of the lead 23 can be prevented.

Embodiment 6

Figure 11:
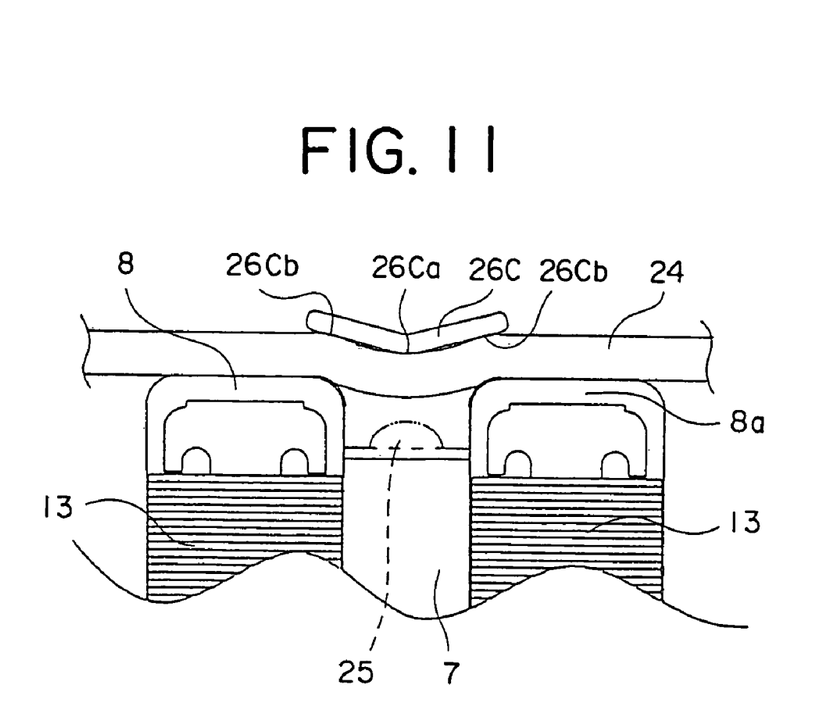
FIG. 11 is a side elevational view of essential portions of a magneto generator according to a sixth embodiment of the present invention.

FIG. 11 is a side elevational view of essential portions of a magneto generator according to a sixth embodiment of the present invention.

In this magneto generator, a lead clamp 26C made of resin has its central portion 26Ca bent into a V-shaped configuration, so that a third protective tube 24 is pressed by the central portion 26Ca and opposite ends 26Cb of the lead clamp 26C.

The construction of this sixth embodiment other than the above is similar to that of the first embodiment.

Since in this embodiment, the lead clamp 26C is bent into the V-shaped configuration, the lead 23 being pressed by the lead clamp 26C is inserted into between the teeth 13 by bending deformation, and the adjoining teeth 13, the lead clamp 26A and the lead 23 are much more integrated with one another in comparison with the fourth embodiment. Accordingly, the break or disconnection of the lead 23 and the lead wires 10*a*, 10*b*, 11*a*, 11*b*, 12*a*, 12*b* resulting from the difference in the vibration frequencies of the teeth 13, the lead clamp 26C and the lead 23 can be reduced in comparison with the fourth embodiment.

Embodiment 7

Figure 12:
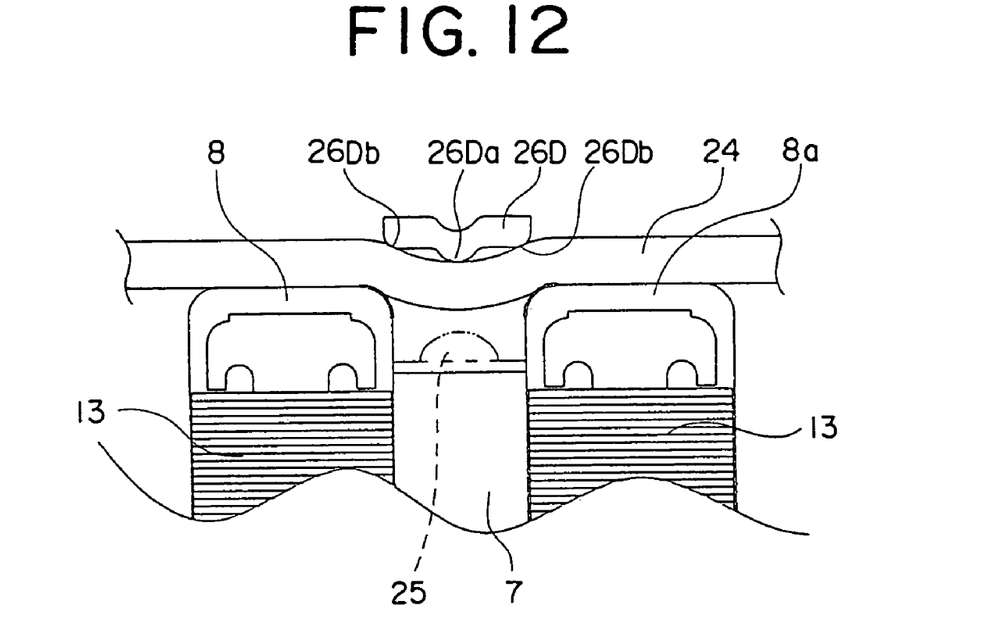
FIG. 12 is a side elevational view of essential portions of a magneto generator according to a seventh embodiment of the present invention.

FIG. 12 is a side elevational view of essential portions of a magneto generator according to a seventh embodiment of the present invention.

In this magneto generator, a lead clamp 26D made of rolled steel plate has a diametrally extending concavo-convex portion 26Da formed at a central portion of a surface pressing against a coil end 8*a*.

The construction of this seventh embodiment other than the above is similar to that of the fourth embodiment.

Since in this embodiment, the lead clamp 26D has the concavo-convex portion 26Da formed on the central portion, the lead 23 being pressed by the lead clamp 26D is more deeply inserted into between the teeth 13 in comparison with the fourth embodiment, whereby the adjoining teeth 13, the lead clamp 26D and the lead 23 are much more integrated with one another in comparison with the fourth embodiment.

In addition, the concavo-convex portion 26Da can be easily formed by press working.

Embodiment 8

Figure 13:
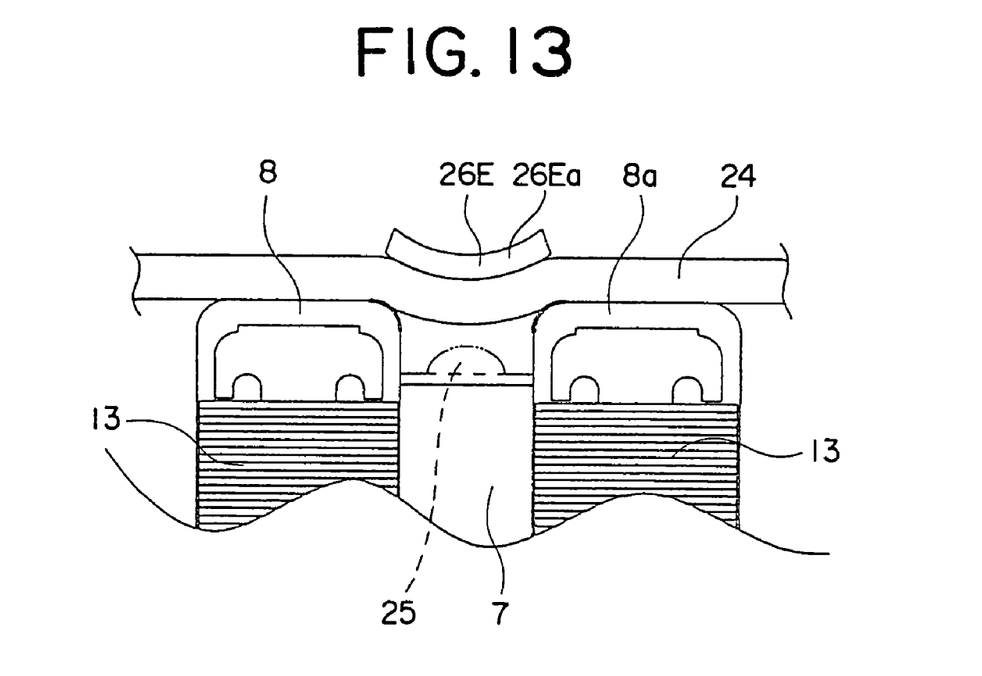
FIG. 13 is a side elevational view of essential portions of a magneto generator according to an eighth embodiment of the present invention.

FIG. 13 is a side elevational view of essential portions of a magneto generator according to an eighth embodiment of the present invention.

In this magneto generator, a lead clamp 26E made of rolled steel plate has a bulged curved portion 26Ea pressing against a coil end 8a.

The construction of this eighth embodiment other than the above is similar to that of the fourth embodiment.

In this embodiment, since the lead clamp 26E is formed with the bulged or curved portion 26Ea, the lead 23 being pressed by the lead clamp 26E can be inserted into between the teeth 13 without being subject to forced stress.

Embodiment 9

Figure 14:
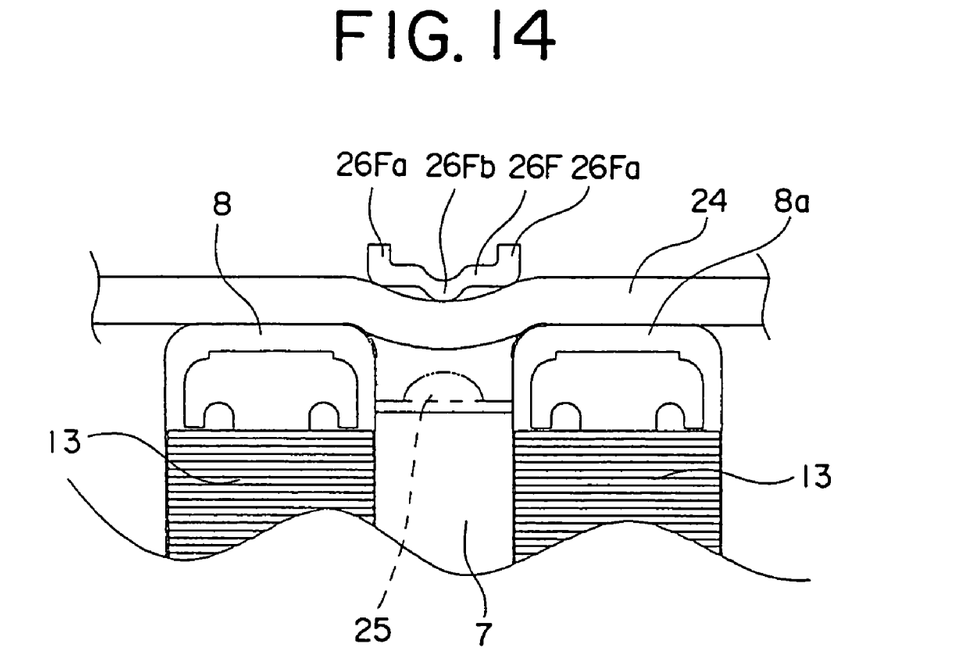
FIG. 14 is a side elevational view of essential portions of a magneto generator according to a ninth embodiment of the present invention.

FIG. 14 is a side elevational view of essential portions of a magneto generator according to a ninth embodiment of the present invention.

In this magneto generator, a lead clamp 26F made of rolled steel plate has a diametrally extending concavo-convex portion 26Fb formed at a central portion of a surface pressing against a coil end 8a, and is formed at its opposite ends with bent portions 26Fa bent to a side opposite to the coil end 8a.

The construction of this ninth embodiment other than the above is similar to that of the fourth embodiment.

Since in this embodiment, the lead clamp 26F has the concavo-convex portions 26Fb formed on the central portion, the lead 23 being pressed by the lead clamp 26F is more deeply inserted into between the teeth 13 in comparison with the fourth embodiment, so that the adjoining teeth 13, the lead clamp 26F and the lead 23 are much more integrated with one another in comparison with the fourth embodiment.

In addition, since the lead clamp 26F is formed at its opposite ends with the bent portions 26Fa, the rigidity of the lead clamp 26F becomes high, so that the amount of flexible deformation of the lead clamp 26F generated when the lead clamp 26F is pressed against the coil end 8a can be reduced, and a hold-down force to the lead 23 can be transmitted in a more reliable manner.

Embodiment 10

Figure 15:
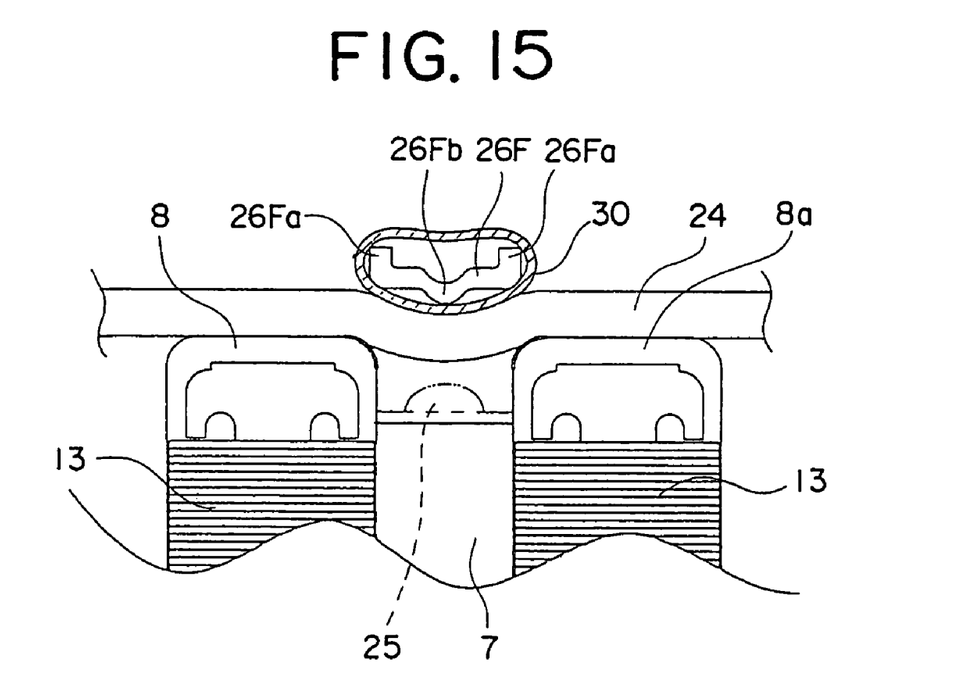
FIG. 15 is a side elevational view of essential portions of a magneto generator according to a tenth embodiment of the present invention.

FIG. 15 is a side elevational view of essential portions of a magneto generator according to a tenth embodiment of the present invention.

In this magneto generator, the surface pressing against the coil end 8a of the lead clamp 26F of the sixth embodiment is enclosed by an elastic member 30.

The construction of this tenth embodiment other than the above is similar to that of the fourth embodiment.

In this embodiment, the lead clamp 26F similar to that of the ninth embodiment, and hence has advantageous effects similar to those of the ninth embodiment.

In addition, although the dimension of the magneto coil 8 in an axial direction of the stator 2 has variations depending upon the winding condition of the conductor, etc., the elastic member 30 enclosing the lead clamp 26F serves to absorb such variations, whereby the lead clamp 26F can press the lead 23 toward the coil end 8a in a stable manner.

Although in the above-mentioned respective embodiments, reference has been made to the three-phase magneto coil 8 with its individual phase coil portions being connected with one another by a delta connection, the present invention can be applied to a three-phase magneto coil with its individual phase coil portions being connected with one another by a star connection.

In addition, in the above-mentioned fourth through tenth embodiments, reference has been made to an example in which each of the lead clamps 26A, 26B, 26C, 26D, 26E, 26F is arranged between adjoining ones of the teeth 4 when viewed along the direction of the axis of rotation, but if focus is placed only on the elimination of a gap between each of the lead clamps 26A, 26B, 26C, 26D, 26E, 26F and the coil end 8a of the magneto coil 8, each of the lead clamps 26A, 26B, 26C, 26D, 26E, 26F may of course be arranged on the teeth 13 when viewed along the direction of the axis of rotation.

While the invention has been described in terms of preferred embodiments, those skilled in the art will recognize that the invention can be practiced with modifications within the spirit and scope of the appended claims.

What is claimed is:

1. A magneto generator comprising:
a flywheel that rotates about an axis of rotation;
a plurality of permanent magnets that are arranged on an inner peripheral wall surface of said flywheel in a circumferential direction thereof and fixedly secured thereto;
a stator core that is arranged at a diametrally inner side of said flywheel with its outer peripheral surface being in opposition to said permanent magnets; and
a three-phase magneto coil that has an conductor wound around each of teeth that are formed on an outer peripheral portion of said stator core so as to radially protrude in diametrally outer directions at equal intervals;
wherein second phase lead wires and third phase lead wires among individual one pair of first, second and third phase lead wires of said magneto coil which are led out in an axial direction at circumferential intervals are bent in said circumferential direction toward said first phase lead wires, and bundled together with said first phase lead wires; and
said first phase lead wires, said second phase lead wires and said third phase lead wires thus bundled are respectively bent in a direction opposite to said circumferential direction.

2. The magneto generator as set forth in claim 1, wherein second phase lead wires and third phase lead wires are covered with first protective tubes.

3. The magneto generator as set forth in claim 1, wherein first phase lead wires, second phase lead wires and third phase lead wires thus bent in said direction opposite to said circumferential direction are covered with second protective tubes, respectively, and said second protective tubes are arranged in a row along a diametral direction.

4. The magneto generator as set forth in claim 2, wherein said first protective tubes are fixedly attached to an end face of a coil end of said magneto coil.

5. The magneto generator as set forth in claim 1, wherein first phase lead wires, second phase lead wires and said third phase lead wires are arranged between said individual teeth, respectively.

6. The magneto generator as set forth in claim 1, wherein first phase lead wires are arranged at locations more apart from a lead composed of lead portions for leading out to electrical equipment than second phase lead wires and third phase lead wires.

7. The magneto generator as set forth in claim 2, wherein one first phase lead wire among one pair of first phase lead wires is wound around second phase lead wires and third phase lead wires covered with said first protective tubes together with the other first phase lead wire to bundle them together.

* * * * *